(12) United States Patent
Castillo et al.

(10) Patent No.: US 7,881,440 B2
(45) Date of Patent: Feb. 1, 2011

(54) METHOD FOR AUTOMATIC GRAPHICAL PROFILING OF A SYSTEM

(75) Inventors: Cecilia M. Castillo, Lebanon, NJ (US); Theodore J. Roycraft, Califon, NJ (US); James Wilson, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1417 days.

(21) Appl. No.: 11/071,001

(22) Filed: Mar. 3, 2005

(65) Prior Publication Data

US 2006/0147020 A1 Jul. 6, 2006

Related U.S. Application Data

(60) Provisional application No. 60/638,207, filed on Dec. 22, 2004.

(51) Int. Cl.
- H04M 1/24 (2006.01)
- H04M 3/08 (2006.01)
- H04M 3/22 (2006.01)
- H04M 11/00 (2006.01)
- H04M 15/00 (2006.01)
- H04M 3/00 (2006.01)

(52) U.S. Cl. .............. 379/29.1; 379/88.18; 379/112.08; 379/265.06

(58) Field of Classification Search ............. 379/1.01, 379/9, 29.09, 32.01, 88.18, 265.03, 265.06, 379/29.1, 112.06, 112.07, 112.08
See application file for complete search history.

(56) References Cited

U.S. PATENT DOCUMENTS

| | | | |
|---|---|---|---|
| 6,810,111 B1 * | 10/2004 | Hunter et al. | 379/1.02 |
| 6,823,054 B1 | 11/2004 | Suhm et al. | |
| 6,937,705 B1 * | 8/2005 | Godfrey et al. | 379/88.18 |
| 2003/0088413 A1 | 5/2003 | Gomez | |
| 2003/0112958 A1 * | 6/2003 | Beaudoin et al. | 379/221.15 |

FOREIGN PATENT DOCUMENTS

WO    WO-03/021445 A    3/2003

OTHER PUBLICATIONS

Extended European search report for EP 05270096, Jun. 6, 2008, 8 pages.
"Automated Regression Testing for IVR Applications", Internet Citation, [Online], Retrieved from the Internet: URL:http://www.protocoltester.com/download/voip/Auto_Testing_for_IVR_Apps.pd>, [retrieved on Nov. 5, 2002.

* cited by examiner

*Primary Examiner*—Quoc D Tran

(57) ABSTRACT

A method and apparatus for processing unique dialogs from a dialog system to identify paths through the dialog system, each unique dialog having a corresponding identified path and generating a visual call flow representation as a function of the identified paths of the dialog system, the call flow representation including nodes and edges connected to correspond to the identified paths.

21 Claims, 3 Drawing Sheets

Dialog System 50

Call Flow Diagram 100

METHOD FOR AUTOMATIC GRAPHICAL PROFILING OF A SYSTEM

This application claims the benefit of U.S. Provisional Application No. 60/638,207, filed Dec. 22, 2004, which is herein incorporated by reference in its entirety.

BACKGROUND INFORMATION

Dialog systems have evolved to become very complex and can be composed of large numbers of components (both hardware and software) which have to interact and work together correctly to bring about the result desired by the user. Due to the complexity of the system involved, it is vital that extensive testing be carried out before the deployment of the dialog system for use by customers and to verify the performance and correctness of the dialog. After the dialog system has been deployed and used by the customers, it is still important to monitor its performance and correctness to optimize the system's use of resources and to monitor the complex interactions between the different components of the system, as well as to evaluate the current callflow effectiveness and correctness Modeling of the dialog system is a vital part of pre-deployment testing as well as of providing subsequent performance improvements, physical improvements and user interface improvements, e.g., improvements to the dialog itself. However, the analysis of the dialog system can be exceedingly difficult because of the very large number of transactions with the users that take place during a given period of time, and because of the complexity of the steps that may be performed by the many components for each transaction. One type of system which has gained popularity is a natural language dialog system, in which the users can speak in natural language and be understood by the dialog system. In the spoken dialog system, large numbers of specific dialogs travel from root nodes to leaf nodes of the dialog system. Each dialog represents a call or an exchange of data, communication or information between customers and the system.

One way of analyzing the dialog system is to use reports. However, the reports are generally prepared in response to defined requirements and to analyze and resolve a specific problem. Thus, the reports are not well suited to uncover more general problems within the dialog system, and to review the operation of the dialog system as a whole. Call flows, also known as sequence diagrams, are more useful to analyze dialog systems because they allow the developer to visually depict the messages and interactions which take place between the dialog system's components and the users, and the associated state transitions between the components. Call flows are well suited to represent and model the flow of messages, events and actions which takes place between the components of a complex system and a user. Call flows may be used to design, document and validate the architecture and logic of a system by describing the sequence of actions needed to carry out a task.

SUMMARY OF THE INVENTION

In one aspect, embodiments of the present invention are directed to a method to process unique dialogs from a dialog system to identify paths through the dialog system. Each unique dialog has a corresponding identified path. This is used to generate a visual call flow representation as a function of the identified paths of the dialog system, the call flow representation including nodes and edges connected to correspond to the identified paths.

In another aspect, embodiments of the present invention are directed to an apparatus for analyzing a dialog system which includes a processor, a display coupled to the processor and a memory coupled to the processor. The memory stores instructions adapted to be executed by the processor to process unique dialogs from the dialog system to identify paths through the dialog system, each unique dialog having a corresponding identified path, and generate a visual call flow representation as a function of the identified paths of the dialog system, the call flow representation including nodes and edges connected to correspond to the identified paths.

In addition, a method of transmitting system dialog to a communications network from a dialog system server, receiving user dialog from at least one user communication device via the telecommunications network and generating a visual call flow diagram in real time using the system dialog and user dialog.

DETAILED DESCRIPTION

Figure 1:
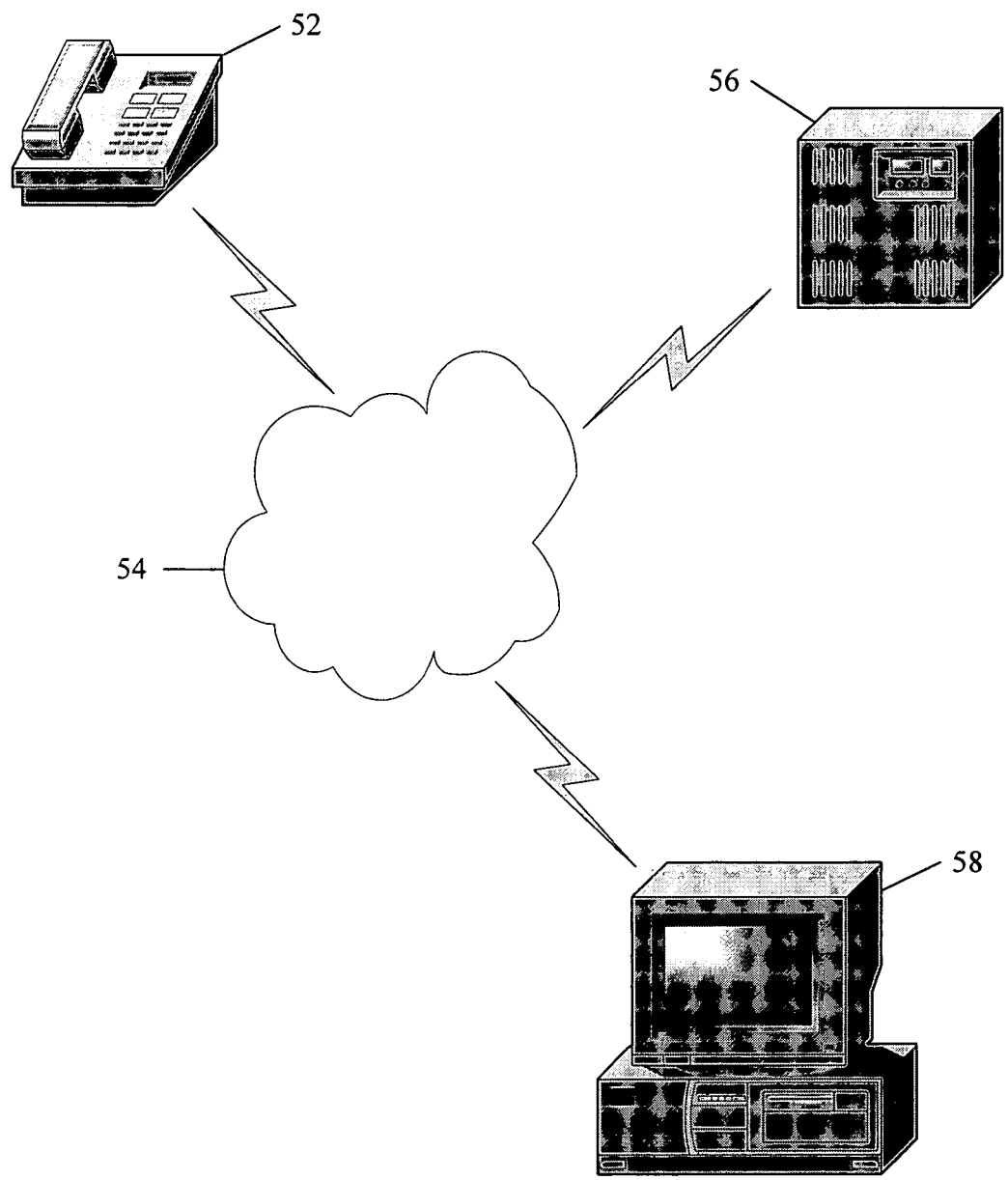
FIG. 1 shows a dialog system according to an exemplary embodiment of the present invention.

The present invention may be further understood with reference to the following description and the appended drawing, wherein like elements are referred to with the same reference numerals. The present invention addresses shortcomings in the field of monitoring and testing communication systems, and in particular, spoken dialog systems. More specifically, the invention is related to monitoring systems using a graphical call flow to analyze and display a system, and to dynamically monitor the system in real time.

A spoken dialog system has become increasingly common in deployed communication systems and services. Several types of the spoken dialog system exist today which provide the user with some freedom in communicating with the dialog system. In some dialog systems, speech inputs by the user are allowed, but there are many constraints on what the user can say that will be understood by the dialog system. Other dialog systems are more flexible and allow the user to use unconstrained fluent speech to communicate with the dialog system to perform some action. Such dialog systems are generally very complex, and often include a variety of components which have to work together to perform the task requested by the user. Many actions may be required to perform the tasks requested, adding to the complexity of the dialog system.

Those of skill in the art will understand that the analysis tool of the present invention may be applied to any system that can be depicted as a call flow/network. For Interactive Voice Response ("IVR") systems a call flow may be used to represent systems that use, for example, touch tone, directed dialog (e.g., say or press one) or natural language. A call flow based on any of these exemplary systems can be complex, e.g., a touch tone application is not necessarily less complex than a natural language application from the perspective of analysis or design. However, the present invention is not limited to IVR systems, but may be used with any system that can be depicted as a call flow/network.

FIG. 1 shows a dialog system 50 according to an exemplary embodiment of the present invention. The dialog system 50 includes a user communication device 52. The user communication device 52 may be, for example, a telephone. The user communication device 52 may transmit and receive information (e.g., voice communications) via a network 54 (e.g., a telecommunications network). A dialog system server 56 may be in communication with the network 54 to transmit information (e.g., system dialog) to the user communication device 52. A computer 58 may receive and process information (e.g., user dialog) from the user communication device 52 via the network 54. As one of ordinary skill in the art will understand, the dialog system server 56 and computer 58 may be co-located in the dialog system 50. Furthermore, embodiments of the dialog system 50 may include any number of additional user communication devices 52, dialog system servers 56, and/or computers 58.

Due in part to the complexity of dialog systems, it is necessary to conduct extensive pre-deployment testing to ensure that the dialog systems (e.g., dialog system 50) perform as expected and properly carry out the instructions and requests received from the user. A continuous monitoring of the dialog systems may be also necessary to make sure that the dialog systems continue to perform as required and to optimize the use of the various components of the dialog systems. The identification and correction of problem areas of the dialog systems is also important during the continuing monitoring of the dialog systems. These tasks are rendered more complex by the large volume of interactions which take place between users and the dialog systems, making it impossible to monitor every single interaction.

One method of monitoring a deployed dialog system is to use summary reports. Summary reports may be prepared on a daily, weekly or other time basis. These give a breakdown of outcomes of the transactions undertaken by users with the dialog system, such as completions, discontinuations and transfers to other dialog systems. However, these reports typically are not sufficiently detailed to be used as a diagnostic tool to determine which parts of the dialog system are not performing as expected. Reports are also generally prepared in response to defined requirements and specifications, and thus are not well suited to uncovering new problems within the flow of communications taking place in the dialog system. The reports also cannot give an overall assessment of the flow of calls in the dialog system, and cannot provide feedback in real time to the developers.

A number of methods of analyzing the dialog systems may be used. For example, a call flow diagram (also known as a "sequence diagram") may be used to visually inspect the behavior of a dialog system (e.g., dialog system 50). The call flow in its simplest form is a graph representing the dialog system, and in some cases containing cycles over some portions of the network being represented. The call flow diagram (or call flow) is an example of a graphical or visual call flow representation. As used in this description, the term call flow specification is used to refer to all possibilities/behaviors of a particular system. A call flow diagram is a graphical representation of the call flow specification, i.e., a graphical representation of the entire dialog system. A call flow diagram may be separated into multiple diagrams representing smaller pieces or sections of the entire dialog system. In contrast, a single path through the call flow diagram is one dialog (e.g., one user interaction (or session) with the dialog system). As will be described in more detail below, a call flow diagram may have a root node and multiple interior and leaf nodes. A dialog is represented by a path which traverses these nodes. Those of skill in the art will understand that there may be other types of call flow representations.

Figure 2:
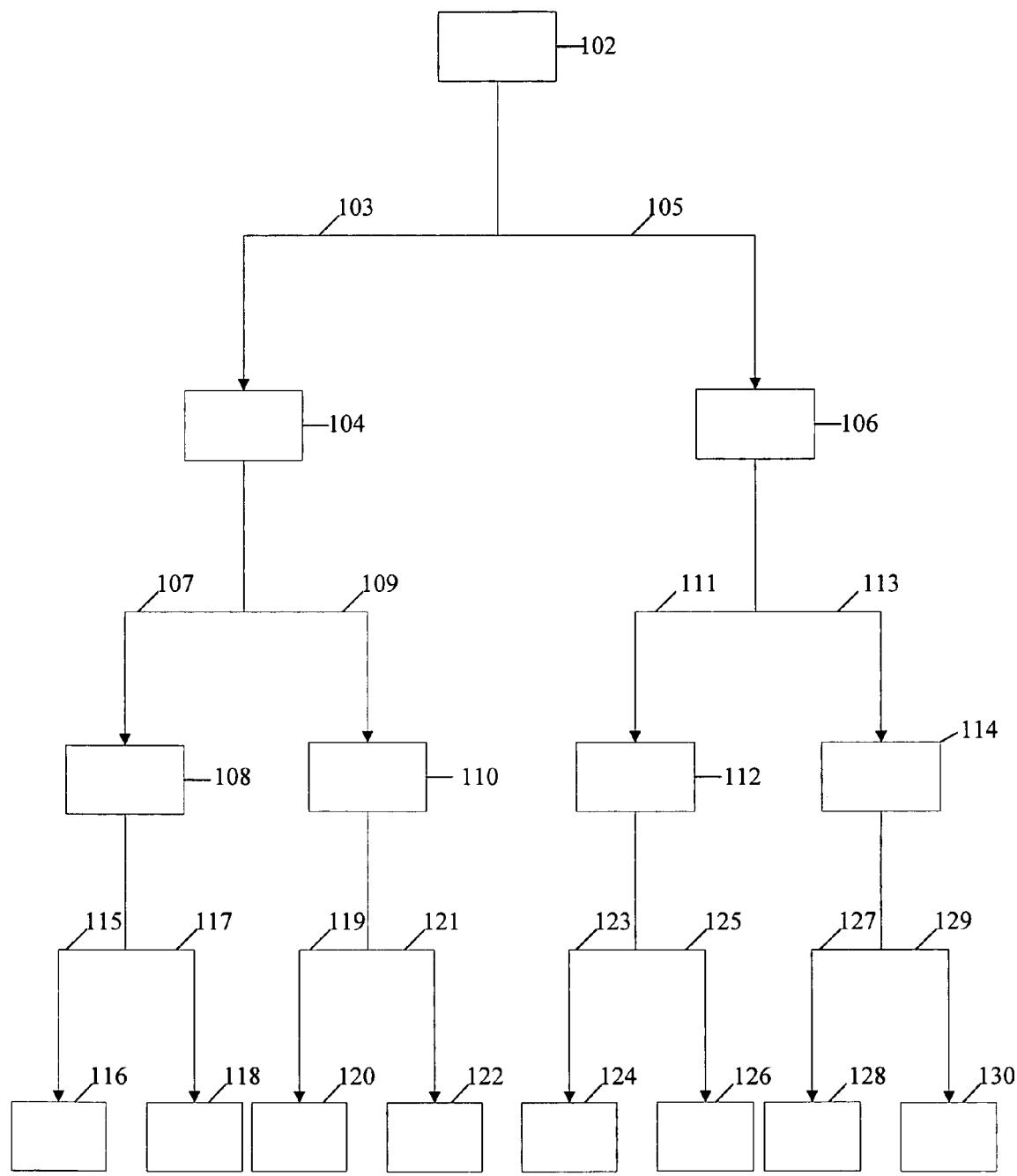
FIG. 2 shows a call flow diagram according to an exemplary embodiment of the present invention.

An exemplary embodiment of a call flow diagram 100 is shown in FIG. 2. The call flow diagram 100 represents the call flow specification, e.g., all possible user paths through the dialog system as each individual dialog progresses. The call flow diagram 100 may be organized in a tree fashion, with sub-dialogs (e.g., interior nodes, leaf nodes and paths) occurring in some of the branches which involve repeated interactions with the user. For example, the call flow diagram 100 may begin with a root note 102. A path 103 extending from the root node 102 to an interior node 104 within the call flow 100 represents a specific dialog, or a specific exchange of information taking place between a user and the dialog system 50. An interior node is a node which has a successor node (e.g., nodes 104, 108 and 110 each have one or more successor nodes and are therefore interior nodes). A leaf node is a node which does not have any successor nodes (e.g., nodes 116, 118, 120 and 122 do not have any successor nodes and are therefore leaf nodes). A particular dialog may traverse through multiple paths and interior nodes and terminate at either an interior node or a leaf node.

As one of ordinary skill in the art will understand, the call flow diagram 100 shown in FIG. 2 may represent a portion of a larger and more complex call flow diagram which includes loops and complex branching. The call flow diagram 100 is the call flow specification and thus is a representation of the entire dialog system's behavior. Each dialog which traverses through the paths and nodes of the call flow diagram 100 may be mapped or overlayed onto the call flow diagram 100. Therefore, the call flow may contain a very large number of unique dialogs (i.e., paths, interior nodes and leaf nodes), for example tens of thousands or even an unbounded number of unique dialogs. The large number of unique dialogs existing in the dialog system 50, and the complex interactions between components of the dialog system 50 which may be required by each of those unique dialogs contribute to make the call flow very complex.

One problem encountered by the designers and developers of the dialog system is the difficulty in analyzing the call flows once the dialog system has been deployed. The dialog system is designed to receive calls from users that are attempting to perform a variety of tasks. Thus, there are usually large variations of behavior between individual calls due to the different requests made by the users. Because of the large number of calls processed, it is not practical to inspect and evaluate the performance of the dialog system with respect to each call, and there is a need for monitoring tools which are able to provide an overall analysis of the system's performance, and to point out individual calls within the system which do not fall within certain acceptable parameters.

Exemplary embodiments of the present invention provide a developer/designer of a dialog system (or any system which can be modeled or depicted as a call flow or network diagram) with tools necessary to analyze a large number of calls or transmissions which take place within the dialog system (e.g., dialog system 50). The present invention may be utilized to map summaries of the plurality of dialogs to a call flow diagram so that any variations from the specification of one or more dialog can be noticed and analyzed further. By utilizing a graphical interface, the developer/designer can visually inspect the behavior of the dialog system (e.g., to validate standard flows, identify anomalies in the call flows, and to point out deviations from the expected norms). A visual representation of the behavior of the dialog system is extremely helpful because a very large amount of data can be displayed simultaneously, and abnormal patterns may be easily noticed. In particular, the expected normal behavior of the dialog system may also be displayed along with any data representing an aberrant interaction allowing such an interaction to be spotted very easily.

The visual display of call flows according to embodiments of the present invention permits the developer to browse the call flow by monitoring the overall patterns of the calls. At the same time, the present invention permits the developer to look more closely at calls or at portions of the call flow which appear to fall outside of the normal expected behavior of the dialog system. For example, the developer may investigate anecdotal field observations, to determine whether an anomalous process is responsible for the unexpected results. Inefficient aspects of the dialog system may also be uncovered by analyzing the visual representation of the call flow, to determine whether streamlining or other improvements to the dialog system may be carried out. Using the analysis tools provided by exemplary embodiments of the present invention shortens the time necessary to uncover problems and to improve the performance of the dialog system.

A call flow diagram represents a specification for a dialog system. The call flow diagram may specify, for example, the actions that the application or the dialog system should carry out based on the inputs and commands provided by the user. In some cases, external information (e.g., retrieved from a database) may also be used to guide how the dialog system reacts to the control inputs. As discussed above, the call flow diagram represents all the possible user paths through the dialog system. The call flow diagram may be generated based on actual usage of the dialog system (e.g., recording multiple dialogs which represent all possible scenarios). However, it is more likely that the call flow diagram will be based on a design specification of the dialog system (e.g., the dialog system designers specify all potential paths through the system).

The overlayed or mapped dialogs on the call flow diagram represent one or more paths followed by users through the dialog system. Typically, the mapped dialogs represent many users over many interactions, and thus create a visual representation of actual user experience with the dialog system. The results may be viewed utilizing a visualization tool which produces a graphical representation of the dialogs within the call flow diagram. The developer may then evaluate and implement modifications to the dialog system based on the observed call flow.

The embodiments of the present invention provide the developer or designer of a system, and in particular of a spoken dialog system (e.g., dialog system 50), with the tools to analyze the dialog system, to graphically display the results of the analysis and to update the results to obtain a dynamic representation of the dialog system in real time. Call flow diagrams are the tool used to analyze the dialog system in the exemplary embodiment of the present invention. A call flow diagram typically represents a specification for the dialog system. According to the present invention, the automatic graphical profiling process may record every node and every edge of the call flow that each unique dialog traverses in the course of carrying out a procedure requested by the user. As a result, the automatic graphical profiling process according to the present invention can update the call flow and can summarize the results of many dialogs in an output which then can be analyzed by the developer.

In one embodiment of the present invention, the results generated by the original call flow and by the updated call flow can be represented graphically (e.g., call flow diagram 100), to simplify the analysis of the dialog system. For example, a percentage or a raw count of how many times each node or edge was visited by the unique dialogs can be produced, which can be used to visually indicate how calls were routed through the call flow. A display system using color encoding and shape properties may be used to reflect the results obtained, and to graphically present them to the developer. For example, different shapes and colors may be utilized to represent the various users of the system, the devices within the spoken dialog system that are utilized, and the various actions taken as a result of the unique dialogs.

In many cases it may be beneficial to have a real time representation of the dialogs taking place within the dialog system. This permits the developer to monitor the dialog system's performance, take some action to optimize and improve that performance, and to observe the results of those actions. Accordingly, a run time dialog system is provided which can send the information to the process according to the present invention, and which in turn can generate a call flow which is updated dynamically to display the progress of the dialog. Accordingly, the automatic graphical profiling process according to the present invention provides a tool for graphically summarizing and profiling dialogs within the dialog system by using the dialog system's call flow, and for graphically following the execution of a dialog in real time by dynamically updating the call flow.

The automatic graphical profiling process according to embodiments of the present invention reflects the run time behavior of a dialog with respect to the call flow which defines it. A real time representation of the dialogs which exist within the dialog system can thus be constructed to evaluate, test and monitor the dialog system. A graphical interface provides one of the most intuitive and usable methods of analyzing the results of the exemplary automatic graphical profiling process. Graphical tools for drawing call flows typically have interfaces which allow applications to manipulate the shapes and other properties of the call flow, for example to reflect nodes and edges of the call flow. For example, Microsoft Visio graphic software may be used for this purpose.

Figure 3:
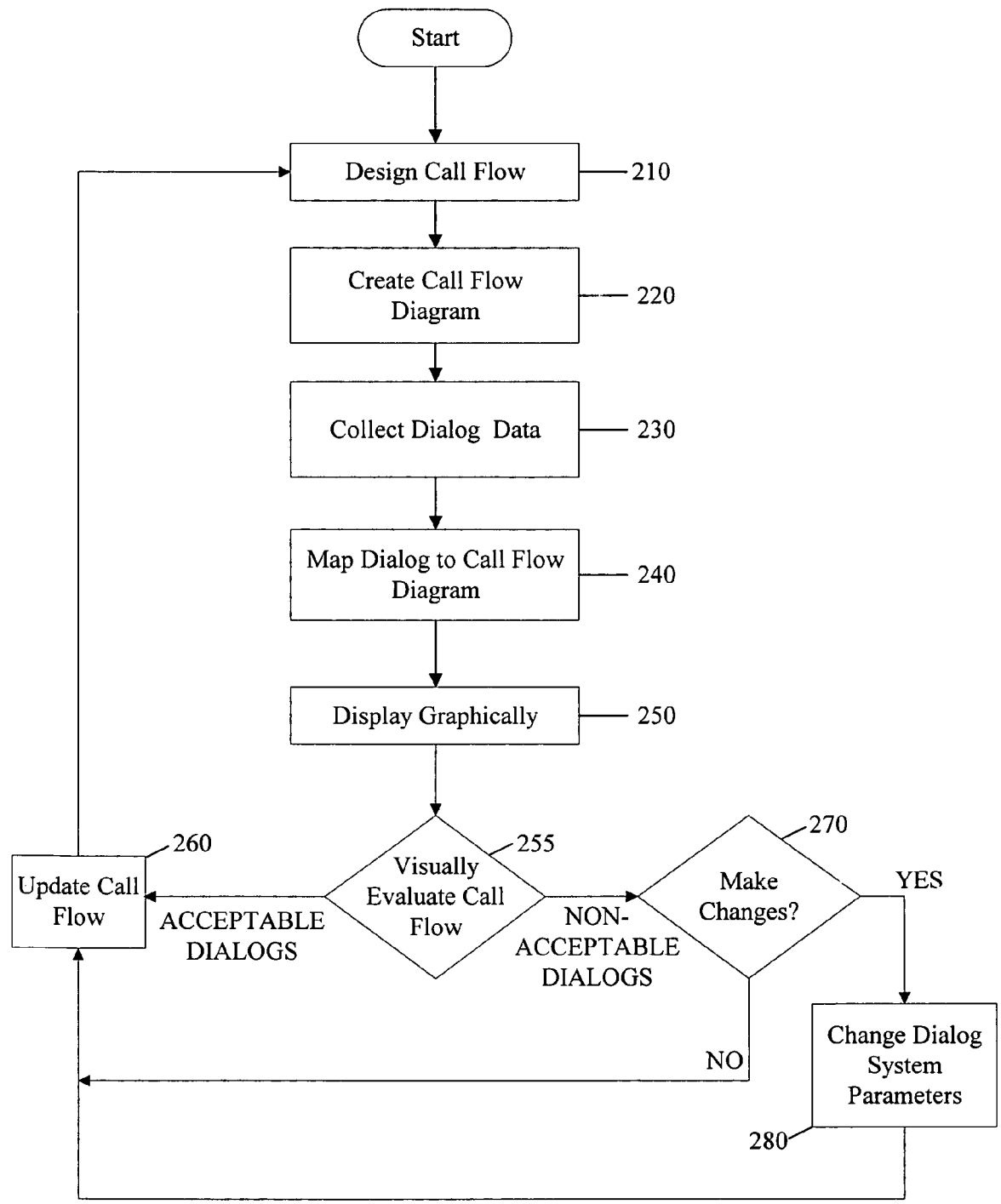
FIG. 3 shows a method for analyzing a dialog system according to an exemplary embodiment of the present invention.

FIG. 3 shows a diagram of an exemplary embodiment of the automatic graphical profiling process according to the present invention. In the step 210, the developer designs a desired call flow for the dialog system, i.e., the call flow specification. As described above, the call flow specification provides all the potential paths through the dialog system. This specification represents the norm, or the expected behavior of the many dialogs which will exist within the dialog system. In step 220, the call flow diagram is created from the call flow specification. As also described above, the call flow diagram is a graphical representation of the call flow specification, i.e., a graphical representation of all potential paths through the dialog system.

In step 230, the data from each of the unique dialogs is collected, e.g., the user interactions with the dialog system. The automatic graphical profiling process then generates a path which represents each of the unique dialogs (step 240). There may be a large amount of unique dialogs which will be shown graphically to the developer. The results of the mapping of the dialogs to the call flow diagram are displayed graphically in the step 250. For example, the graphical representation of the call flow, with its unique dialogs, may be superimposed on a graphical representation of the call flow specification (e.g., the call flow diagram). This procedure allows the developer to visually inspect the various components of the call flow, and to rapidly determine whether any branches or nodes of the call flow do not behave as expected respective to the norm. By comparing the actual unique dialogs within the call flow to the call flow specification, the developer may discern any anomalies which may exist in certain portions of the dialog system.

In many cases, call flows are very large due to the large numbers of dialogs represented therein, and the complex procedures undertaken with each dialog. To simplify the inspection, call flows may be broken down into separate pages, representing various elements of the dialog system. Each shape in the call flow may be given a specific identifier within the automatic graphical profiling process, for example composed of a page index and a shape index. The unique identifier can then be stored in the implementation of the dialog. When the dialog is then run, it is able to record which shapes it visits during its execution, by storing the unique identifiers of the shapes. The stored information about the path taken by every specific dialog can then be used to build a profile of the paths traversed by the dialog, which becomes part of the graphical display of the call flow.

The exemplary automatic graphical profiling process according to the present invention is also adapted to take the recorded shape information from a selected unique dialog, and to modify the corresponding graphical call flow representation to visually identify the paths taken by the unique dialogs. For example, the color, line size, or other attributes of the graphical representations may be modified during this step, to reflect the amount of use various paths receive. The automatic graphical profiling process according to the present invention is also designed to take any number of unique dialogs, and calculate statistical values regarding those dialogs. For example, counts and percentages of how often each point in the call flow was visited by the unique dialogs can be computed, and then can be represented visually on the call flow graphic representation. A large number of dialogs may thus be summarized visually, for easy inspection by the developer.

In one exemplary embodiment of the automatic graphical profiling process, various paths taken by the unique dialogs may be faded out if they are not followed frequently, and may be visually enhanced if they are used extensively. By using this or a similar graphical convention, it is easy to differentiate and identify portions of the dialog system which are often taken or seldom taken by the dialogs. The developer may thus make changes to the dialog system which may result in greater efficiency in carrying out the processes specified by the dialogs.

The automatic graphical profiling process according to the present invention also supports a dynamic update capability, as was described above. According to this process, a running dialog is designed to send its shape information to the automatic graphical profiling process, so that the process in turn can update the call flow with the new information. As a result, the developer is able to observe the actions of the unique dialogs in real time, as represented by the call flow, and as depicted by the graphical interface. This feature of the automatic graphical profiling process according to the present invention helps the developer to understand the call flow, and also is helpful in debugging those dialogs which do not behave properly.

The shape information necessary to construct a dynamic, run time call flow can be automatically embedded in each of the unique dialogs by following methods such as those described in the U.S. patent application Ser. No. 10/826,062, filed on Apr. 16, 2004, titled "System And Method For Converting Graphical Call Flows Into Finite State Machines". The subject matter of the above application is hereby included by reference in its entirety.

As shown in FIG. 3, the developer is able to visually evaluate the call flow generated in the step 250, as described above. For example, deviations from the norm, paths with excessive traffic and paths with sparse traffic may be further analyzed by the developer. If the developer is satisfied with the dialogs presented in the graphical call flow, the process continues to the step 260, where the call flow is updated by following the real time execution of the dialogs, as described above. If the developer is not satisfied with the call flow, he may decide in the step 270 what changes to make to the dialog system to correct those deficiencies. The changes may be implemented in the step 280, by changing some of the dialog system parameters. The run time update then may continue to step 260, where the call flow is updated.

According to the exemplary embodiment of the present invention, the automatic graphical profiling process builds a high level view of the call flow representing the spoken dialog system. This high level view shows how each page of the call flow is related to all other pages. Similarly, every shape within a page is related to the other shapes on that page. The high level view provided by the exemplary automatic graphical profiling process is also adapted to trace the behavior of dialogs among the various pages, and to identify those pages which are rarely or never utilized by the dialogs. As described above, this feature may be invaluable in allowing the developer to troubleshoot and optimize the operation of the dialog system.

The automatic graphical profiling process described herein may be used to visually display and analyze a variety of systems which can be represented by a call flow. The graphical call flow may be translated into a runtime system, which can be analyzed in real time. The present process is well suited to display and analyze spoken dialog systems, due to the large number of interactions and the complexity of the interactions contained therein. One example of such dialog systems is the HMIHY (How May I Help You) system$^{SM}$ developed by AT&T Corp. In this system, customers can talk with machines, expressing what they want in spoken natural language. In this context, natural language refers to a system where the machine understands and acts upon what the users actually say, in contrast to systems where the users have to say what the machine expects them to say. This technology shifts the burden from users to the machine, greatly increasing peoples' capability and willingness to use automation. This is in contrast to the prior generation of voice interfaces, where users must speak a small set of words in some fixed order to carry out a process within the system. According to the HMIHY system$^{SM}$, the machine understands the user's spoken responses and determines what service the user wants, conducting a dialog with the user, if necessary, to gather additional information.

The present invention has been described with reference to specific exemplary embodiments. Those skilled in the art will understand that changes may be made in the details of the invention, without departing from the teaching of the invention. For example, various other graphical display applications may be used to graphically represent the results of the process, and the entire process may be applied to different complex systems which can be represented by call flows. Accordingly, various modifications and changes may be made to the embodiments without departing from the broadest scope of the invention as set forth in the claims that follow. The specifications and drawing are, therefore, to be regarded in an illustrative rather than a restrictive sense.

What is claimed is:

1. A method, comprising:
   processing dialogs from a dialog system to identify paths through the dialog system, each of the dialogs having a corresponding identified path, wherein each of the dialogs comprises a user interaction with the dialog system;

determining a first path of the identified paths having a usage less than a first predetermined value or a usage greater than a second predetermined value;

generating a visual call flow representation of the identified paths of the dialog system, the visual call flow representation including nodes and edges connected to correspond to the identified paths; and displaying the first path in the visual call flow representation as a fading path if the first path is determined to have a usage less than the first predetermined value or as an enhanced path if the first path is determined to have a usage greater than the second predetermined value.

2. The method according to claim 1, wherein the visual call flow representation includes a representation of a call flow specification.

3. The method according to claim 2, wherein the visual call flow representation includes the identified paths of the dialogs overlayed onto the call flow specification.

4. The method according to claim 1, further comprising:
processing additional dialogs, each dialog of the additional dialogs having a corresponding identified path; and
updating the visual call flow representation as a function of the identified paths of the dialog system.

5. The method according to claim 1, further comprising:
comparing the visual call flow representation to a call flow specification showing an expected operation of the dialog system, wherein identified paths shown by the visual call flow representation which are outside of an expected operation are identified on the visual call flow representation.

6. The method according to claim 1, wherein the visual call flow representation includes a line type to identify one of the dialogs.

7. The method according to claim 1, further comprising:
processing one of the dialogs which was incomplete when initially processed resulting in an incomplete corresponding identified path; and
updating the visual call flow representation as a function of the fully processed one of the dialogs.

8. The method according to claim 1, wherein the visual call flow representation includes statistical values.

9. The method according to claim 8, wherein the statistical values include a raw count of a number of times each node and edge of the visual call flow representation is traversed by the dialogs.

10. The method according to claim 8, wherein the statistical values include percentages of node and edge traversal.

11. The method according to claim 1, wherein the visual call flow representation includes statistical values for a subset of the dialogs.

12. The method according to claim 1, further comprising dividing the visual call flow representation into separate pages.

13. The method according to claim 12, further comprising providing indices to relate the separate pages.

14. An apparatus for analyzing a dialog system, comprising:

a processor;
a display coupled to the processor; and
a memory coupled to the processor, the memory storing instructions executable by the processor to:
process dialogs from the dialog system to identify paths through the dialog system, each of the dialogs having a corresponding identified path, wherein each of the dialogs comprises a user interaction with the dialog system;
determine a first path of the identified paths having a usage less than a first predetermined value or a usage greater than a second predetermined value;
generate a visual call flow representation of the identified paths of the dialog system, the visual call flow representation including nodes and edges connected to correspond to the identified paths; and
display the first path in the visual call flow representation as a fading path if the first path is determined to have a usage less than the first predetermined value or as an enhanced path if the first path is determined to have a usage greater than the second predetermined value.

15. The apparatus according to claim 14, wherein the visual call flow representation includes a line type to identify one of the dialogs.

16. The apparatus according to claim 14, wherein the visual call flow representation includes statistical values.

17. The apparatus according to claim 16, wherein the statistical values include a raw count of a number of times each node and edge of the visual call flow representation is traversed by the dialogs.

18. A method, comprising:
transmitting a system dialog to a communications network from a dialog system server of a dialog system;
receiving a user dialog from a user communication device via the communications network, wherein the user dialog comprises a user interaction with the dialog system;
determining a first path in the dialog system having a usage less than a first predetermined value or a usage greater than a second predetermined value;
generating a visual call flow diagram using the system dialog and the user dialog, the visual call flow diagram including nodes and edges connected to correspond to a call flow specification; and
displaying the first path in said visual call flow diagram as a fading path if the first path is determined to have a usage less than the first predetermined value or as an enhanced path if the first path is determined to have a usage greater than the second predetermined value.

19. The method according to claim 18, further comprising comparing the visual call flow diagram with a call flow specification.

20. The method according to claim 18, wherein the visual call flow diagram includes a second path based on the user dialog and the system dialog corresponding to the user dialog.

21. The method according to claim 20, wherein the second path is identified by a line type.

* * * * *